Oct. 18, 1927.
J. H. BOURGON
TOP CONSTRUCTION
Filed Nov. 20, 1924
1,645,582
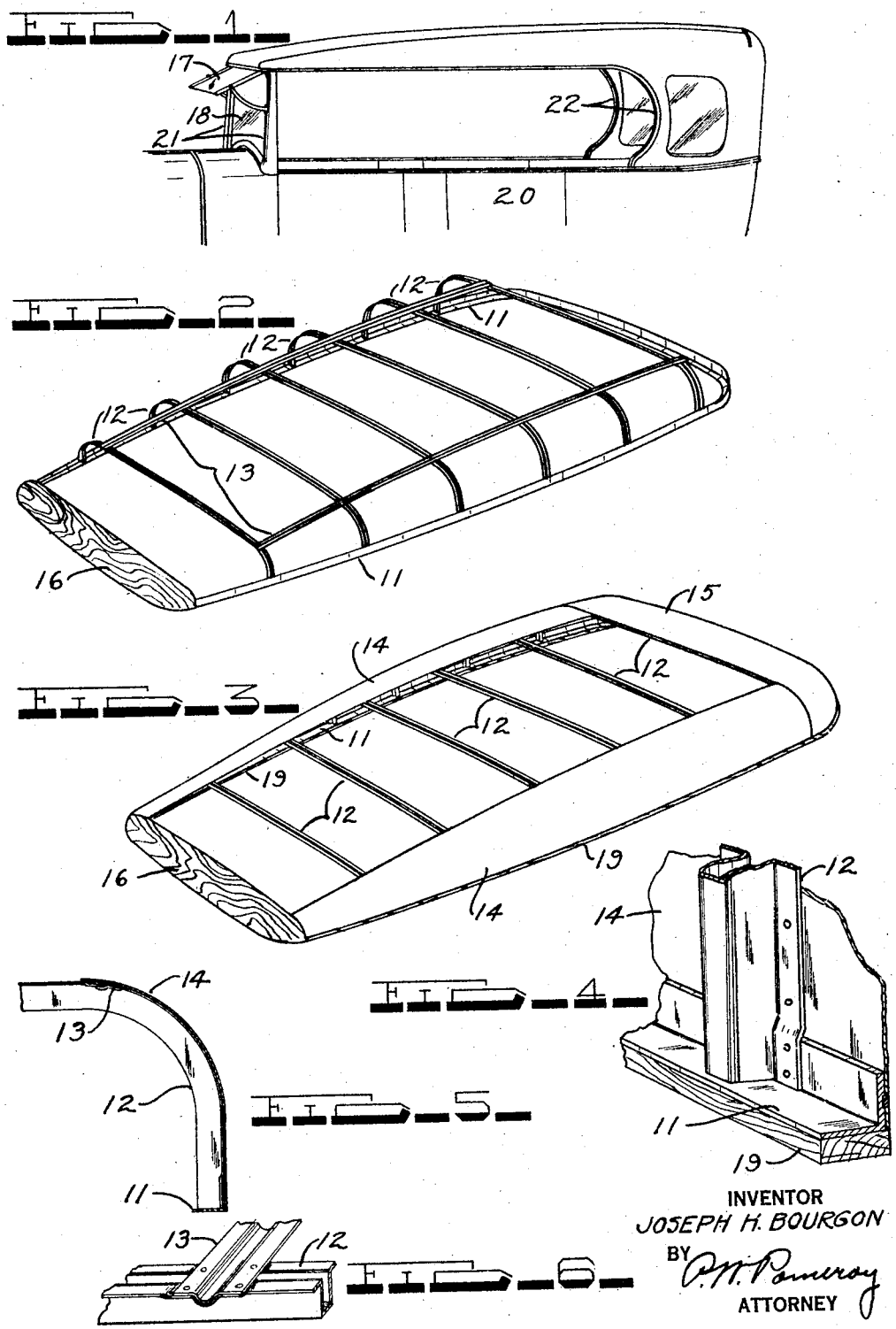
INVENTOR
JOSEPH H. BOURGON
BY
ATTORNEY Patented Oct. 18, 1927.

1,645,582

UNITED STATES PATENT OFFICE.

JOSEPH H. BOURGON, OF DETROIT, MICHIGAN, ASSIGNOR TO THE STUDEBAKER CORPORATION, OF SOUTH BEND, INDIANA, A CORPORATION OF NEW JERSEY.

TOP CONSTRUCTION.

Application filed November 20, 1924. Serial No. 751,153.

This invention relates to tops for motor vehicles and the like and particularly to permanent tops for automobiles of the open type.

One of the objects of the present invention is to provide a top of novel and improved construction, the main portion of which is composed of metal to render it strong and durable and yet of less weight than tops of this type previously in use.

Another object is to provide a vehicle top frame having a main frame base portion of angle iron to which the various other top frame members may be applied to form a permanent unitary structure.

Another object is to provide a vehicle top frame having a continuous angle iron frame base portion extending around the sides and back thereof, and stamped metal rib members tying the sides of said base portion together and being permanently attached thereto.

Another object is to provide a vehicle top frame having a continuous U shaped angle iron frame base member, the side portions of which are bridged by stamped metal ribs permanently secured thereto, the ribs being permanently tied together by longitudinally extending strut members.

A further object is to provide a frame for a permanent vehicle top comprising a U shaped angle iron base portion extending around the sides and back, and connected across the front by a front cross member, stamped metal ribs bridging the side portions thereof and being permanently secured thereto and being permanently tied together by longitudinally extending struts, stamped metal sheathing being provided for the side and rear quarters to give form to the top, and to give added strength thereto and being permanently secured to the several frame members.

A still further object is to provide a top construction which will lend to an automobile body of the open type, the beauty of design afforded in "closed" bodies but at less cost and of much less weight.

The above being among the objects of the present invention the same consists of certain features of construction and combination of parts to be hereinafter described with reference to the accompanying drawing, and then claimed, having the above, and other objects in view.

In the accompanying drawing which illustrates a suitable embodiment of the present invention, and in which like numerals refer to like parts throughout the several views, Figure 1 is a perspective view of the finished top as it appears upon an automobile body.

Figure 2 is a perspective view of the complete top frame before the covering, lining, and other finishing parts are secured thereto.

Figure 3 is a perspective view of the top frame having the rear and side quarter sheathing secured thereto.

Figure 4 is an enlarged framentary sectional perspective view showing a cross rib secured to the angle iron member, and the side quarter sheathing secured to both the cross rib and angle iron member.

Figure 5 is an enlarged cross-sectional view taken through the near side of the top frame shown in Figure 3 at a point adjacent one of the cross ribs.

Figure 6 is an enlarged fragmentary perspective view showing a longitudinal strut secured to a cross rib.

Referring more in detail to the several views, the present invention embodies a horizontally disposed substantially U shaped continuous angle iron member 11, the legs of the U providing the side rails and the bottom of the U serving as the rear frame cross member. Substantially trough-shaped pressed metal transverse ribs 12 have edges which are outwardly flanged and ends which are turned downwardly to the shape of the usual type of top cross ribs. The ribs 12 are used to span the sides of the frame 11 at spaced intervals between the front and back thereof, with their respective ends resting against the vertical legs of the frame 11 and supported by the horizontal legs of the same, and are permanently secured thereto in such a position, preferably by welding, though it is to be understood that rivets or any of the other numerous fastening means may be used. Longitudinally extending struts 13, preferably formed from sheet metal into substantially shallow trough-shaped sections and secured to the cross ribs 12 just above the curved portion of their respective ends, are provided to stiffen the structure and to tie the cross ribs together in order to prevent movement of the same longitudinally of the top.

The length of the frame member 11 is governed by the particular car or design of automobile that the top frame is made for, any number of cross ribs 12 being used as required in connection with a touring car or roadster.

Quarter sheathing members 14, preferably formed from sheet metal, although fiberboard, laminated wood or other suitable material may be substituted therefor, and suitably shaped are mounted on each side of the top frame structure and are secured respectively to the frame member 11, the cross ribs 12 and the longitudinal struts 13. A rear quarter sheathing member 15 preferably formed from sheet metal or material corresponding with the material of the side quarters, and suitably shaped to blend in with the sidequarter sheathing 14, is secured to the rear portion of the frame 11 and to the rear cross rib 12 preferably by spot welding, but, if desired, bolts, rivets or other fastening means may be used. When the top material is assembled to the top frame structure, the shape of the quarter sheathing members 14 and 15 affords a "finished" appearance to the assembled top. The central portion of the top frame is left open and bridged only by the cross ribs 12 to eliminate any drumming such as is usually associated with tops in which the metal extends completely over the same.

It has already been stated that the cross ribs 12 are preferably formed from sheet metal to a substantially trough-shaped section, the edges of which are flanged outwardly. As clearly shown in Figure 4, the extreme end of the cross rib 12 is provided with a depression in the flat face which may be of a depth corresponding to the thickness of the metal in the frame member 11, in order that the remainder of the flat face will be flush with the outer surface of the vertical leg of the frame member 11, thereby providing an unbroken attaching surface for the quarter sheathing member 14.

Likewise at the point of attachment of the longitudinal struts 13, the cross ribs 12 may be formed with depressions of a shape and depth corresponding to the shape and thickness of the struts 13 thereby providing an attaching surface for the quarter sheathing 14 free from inequalities.

The open end of the U shaped frame 11 is closed in by a cross piece 16, preferably made of wood to provide an attaching surface for securing the hinges of the rainshield 17 and windshield 18 thereto.

As is shown in Figure 1 the top is supported on the automobile body 20 by the front supports 21 and rear supports 22, the rear supports 22 being shown as placed a substantial distance in front of the rear of the top and therefore carrying a major portion of the weight of the entire top. The front supports 21 as illustrated are positioned at the extreme front of the top and consequently carry a relatively small portion of the weight of the same, but act to steady the front end thereof. It is understood that the shape, location, and design of the top supporting members can be changed to meet the many requirements in top construction, and if desired the rear supports can be positioned at the extreme rear of the body to support the top at the rear end thereof.

It will be readily seen from the foregoing description that a top structure of this type affords a permanent top for automobiles which is sturdy, durable, light in weight, inexpensive to manufacture, and has the added feature of giving a pleasing effect to the observer. While I have shown and described the U-shaped frame as of angle-iron construction, it is apparent that other forms may be substituted, such as a channel member, Z-bar or I-beam, and that the shape of the ends of the ribs can be modified to meet the changed condition without departing from the present invention.

Formal changes may also be made in the several details of the invention described without departing from the spirit and substance thereof and without departing from the spirit and substance of the broad invention, the scope of which is commensurate with the appended claim.

What I claim is:—

A permanent top frame for an automobile of the open type comprising a substantially U-shaped horizontally disposed base member shaped from angle iron, a front cross member rigidly connecting the free ends of said base member, substantially trough-shaped intermediate ribs formed from sheet metal, and having downwardly curved ends bridging the sides of said base member and permanently secured thereto, longitudinally extending struts formed from sheet metal to substantially shallow trough-shaped sections permanently secured to said intermediate ribs, side quarter sheathing formed from sheet metal to a shape corresponding to the shape of said curved ends of said intermediate members permanently secured to the sides of said top frame, and rear quarter sheathing correspondingly shaped from sheet metal permanently secured to the rear of said top frame.

Signed by me at Detroit, Michigan, U. S. A., this 17 day of November, 1924.

JOSEPH H. BOURGON.